Oct. 11, 1932.                T. J. NEAL                1,881,865
                           ROTARY SNOWPLOW
                         Filed March 24, 1931
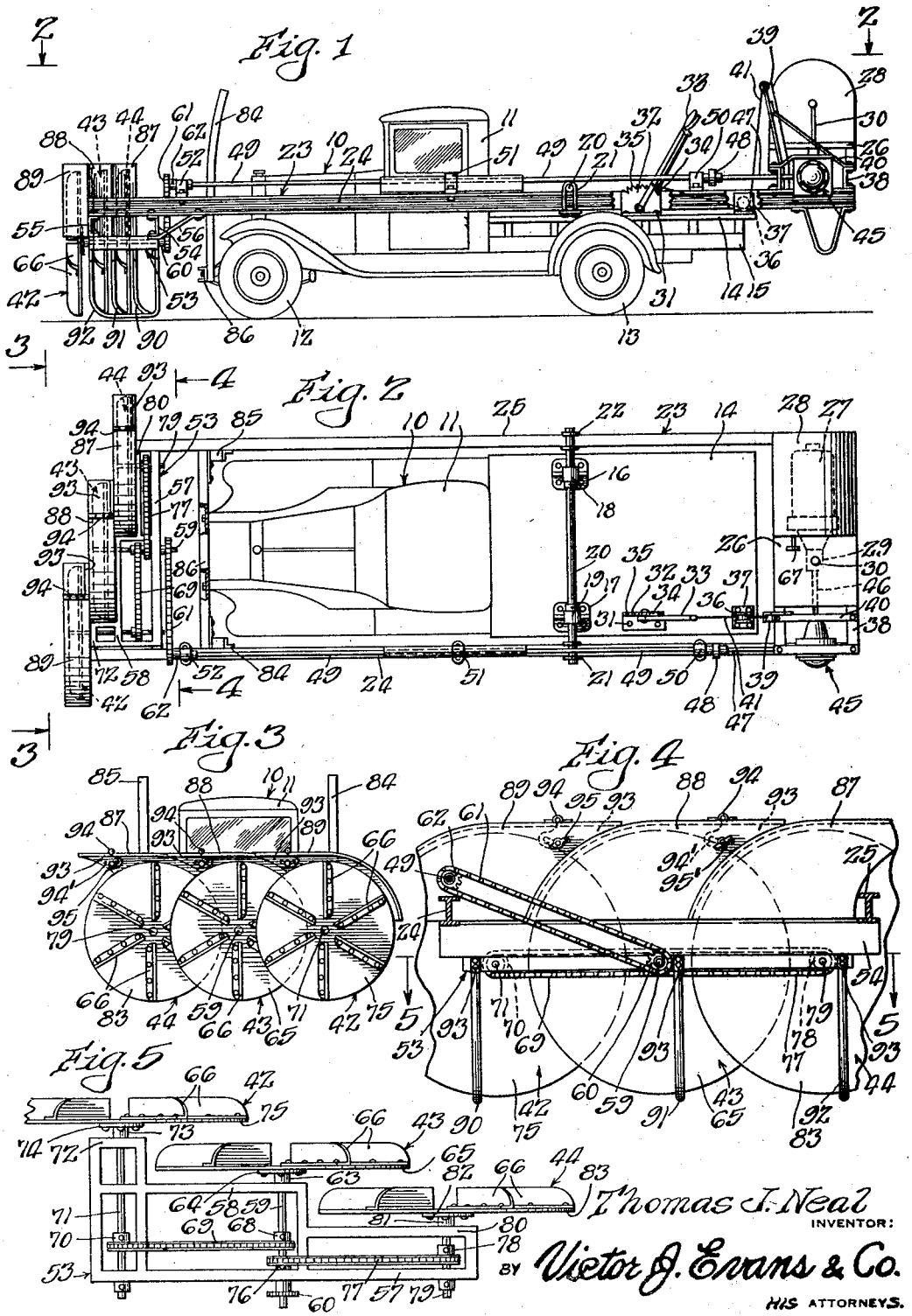

Patented Oct. 11, 1932

1,881,865

UNITED STATES PATENT OFFICE

THOMAS J. NEAL, OF JOLIET, ILLINOIS

ROTARY SNOWPLOW

Application filed March 24, 1931. Serial No. 524,951.

This invention relates to certain novel improvements in rotary snow plows, and has for its principal object the provision of an improved construction of this character which will be highly efficient in use and economical in manufacture.

It is an object of this invention to provide an improved rotary snow plow and, more specifically, a plow which may be mounted on an automotive vehicle truck body or other automotive vehicle.

Another object of the invention is to provide an improved rotary snow plow comprising a plurality of blowers rotatably mounted in offset relation so as to plow a track that is substantially flat and wide, it being well understood that the plows now in use, particularly those adapted for highway use, plow a track that is deeper in the center than at the sides and is therefore an arc in cross section, which renders the track thus plowed disadvantageous for it is apparent that a flat track is desirable.

A further object of the invention is to provide a frame carrying a plurality of rotary blowers arranged in offset relation at the front end of a truck or like body and pivotally mounted thereon so as to be movable in a vertical arc by reason of which arrangement the blowers may be elevated so as to eat into and work down through a drift of snow from the top thereof.

An additional object of the invention is to provide a control arrangement for vertically raising and lowering the blowers.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a side elevational view of an automotive truck showing the invention associated therewith;

Fig. 2 is a top plan view on the line 2—2 in Fig. 1;

Fig. 3 is a front elevational view of the blowers, on line 3—3 in Fig. 2;

Fig. 4 is a rear elevational view of the blowers, on line 4—4 in Fig. 2; and

Fig. 5 is a horizontal sectional view through the blowers, on line 5—5 in Fig. 4, and illustrating the offset arrangement of the blowers.

Referring now particularly to Fig. 1, an automotive truck is indicated at 10 and includes the cab 11, front and rear wheels 12 and 13, and a platform 14 suitably mounted on the chassis 15 of the truck, all of which may be of any approved construction since the same forms no part of this invention. It will likewise be understood that while the invention is illustrated as being associated with a truck it is within the purview of this invention to mount the same on any other suitable power driven vehicle such as are used on railways, or electrically operated trucks for use on either highways or sidewalks.

On the truck platform 14 are uprights or blocks 16 and 17 (Fig. 2) which include bearing collars 18 and 19 in which a shaft 20 is journaled. The shaft 20 is attached at its outer ends, by means of suitable U-bolts 21 and 22, to a rectangular frame 23 which includes side rails 24 and 25 that extend along the sides of the truck 10 and beyond both ends thereof.

At the rear ends of the rails 24 and 25 is a platform 26 which is mounted on a cross frame that is bolted to the rails 24 and 25 and on this platform 26 is mounted a power unit schematically indicated at 27 and enclosed within the hood 28, this unit being in the preferred embodiment of the invention illustrated in the drawing, an automobile motor and the transmission mechanism 29 thereof mounted on the platform 26 in any suitable manner, it being understood that any suitable power unit may be used. The gear shift lever of the transmission mechanism is indicated at 30. Bolted on the truck platform 14 as indicated at 31 is a rack 32 in which is pivotally mounted a hand lever 33 that carries a pawl or dog 34 which is engageable with the teeth 35 of the rack 32. A pulley 36 is mounted on the platform 14, by means of brackets 37. An upright 39 is attached to the cross frame 38 and braced by the brace rod 40 which has one end attached to upright 39 and the other end attached to frame 38. A cable 41 has one end attached to lever 33, extends under the pulley 36, and has its other end attached to the upper end of the upright 39 (Fig. 1). It will be seen, therefore, that by moving the hand lever 33 forward from its position in Fig. 1 the cable 41 will exert a downward force on the upright 39 and the frame 23 will therefore be pivoted about the shaft 20 to elevate the blowers 42, 43, and 44 which are carried by the frame 23 at the front end thereof in a manner to be described presently.

Extending from the transmission 29 of the power unit 27 to a gear mechanism generically indicated at 45, and of any approved construction, is a drive shaft 46. A driven shaft 47 has one end associated with the gear mechanism 45 and the other end connected by means of a coupling 48 to the shaft 49 which is journaled in bearings 50, 51 and 52 that are suitably mounted upon rail 24.

A blower supporting frame, generically indicated at 53 (Figs. 1, 2 and 5) is suspended from the rails 24 and 25, adjacent the front ends thereof, by means of channel irons 54 and 55 that are suitably bolted to the rails 24 and 25 and braced therefrom as at 56. The frame 53 includes a bar 57 and a bar 58 that is parallel to bar 57 but shorter (Fig. 5). Journaled in suitable bearing surfaces on the bars 57 and 58 is a shaft 59 which has a sprocket 60 at its rear end and this sprocket 60 is connected by chain 61 to a sprocket 62 that is mounted on the front end of shaft 49. On the outer and front end of shaft 59 is fixed a collar 63 which includes a flange 64 that is bolted to the disc 65 of the blower 43, each of the three blowers including a disc and radially arranged ribs 66 bolted thereto. It will, therefore, be seen that when the clutch 67 of the power unit 27 is operated to drive shaft 46, through transmission 29, shaft 47 will be driven from gear mechanism 45 and shaft 47 will rotate (through coupling 48) shaft 49, which will rotate sprocket 62, chain 61, sprocket 60, shaft 59 and blower 43. The means for transmitting motion of shaft 59 to blowers 42 and 44, so that these blowers will revolve simultaneously with blower 42, will now be described.

By reference to Fig. 5, it will be seen that there is mounted on the shaft 59 a sprocket 68 around which travels a chain 69 that likewise travels around a sprocket 70 that is mounted on a shaft 71 which is journaled in suitable bearing surfaces in bars 57 and 72 of blower frame 53. On the outer end of shaft 71 is a collar 73 which has a flange 74 that is bolted to the disc 75 of blower 42.

A sprocket 76 is fixed to shaft 59, adjacent bar 57, and over this sprocket 76 travels a chain 77 that also works around a sprocket 78 that is mounted on a shaft 79 which is journaled in suitable bearing surfaces in bars 57 and 80 of blower frame 53. On the front end of shaft 79 is fixed a collar 81 that has a flange 82 which is bolted to the disc 83 of blower 44. It will, therefore, be apparent that when shaft 59 and blower 43 are rotated, in the hereinbefore described manner, rotation of shaft 59 will transmit motion through sprocket 68, chain 69, and sprocket 70 which will revolve shaft 71 and blower 42 in the same (counterclockwise as seen in Fig. 3) direction as blower 43, while like motion will be transmitted from shaft 59 through sprocket 76, chain 77, and sprocket 78 to shaft 79 and blower 44 so that the three blowers 42, 43, and 44 will rotate counterclockwise, as seen in Fig. 2.

It will best be seen, by reference to Figs. 2 and 5, that the three blowers 42, 43, and 44 are offset from alignment with each other and among the advantages of this offset arrangement of these blowers is that, by means of this arrangement, the three blowers will sweep or plow a substantially flat path or track over the highway, as will be best understood by reference to Fig. 3. In this manner a substantially flat wide path may be plowed by means of the three blowers which, as will be seen in the drawing, overlap each other, and thus the undesirable concave path produced by a single blower is eliminated, it being understood that it is impossible to plow a flat path with a single blower since the same digs, particularly in drifted snow, a concave path that is deeper in the center than at the sides. Thus the three overlapping, offset blowers produce a result that cannot be accomplished by means of a single blower, it being understood that the present invention contemplates the use of any number, greater or less than three, of blowers and the use of these blowers in this offset arrangement on any type of vehicle.

To prevent side sway of the frame 23, a pair of uprights or posts 84 and 85 project up between the rails 24 and 25 and have their lower ends mounted on the bumper 86 of the truck 10, in any suitable manner.

Suitably bolted to the frame 53 are deflector plates 87, 88 and 89 which are offset from each other and each of which extends over the top of the blowers 44, 43 and 42 respectively, the tops of these deflectors being parallel to each other. At the upper end of each of the deflector plates 87, 88 and 89 (Figs. 3 and 4) is a hinged wing plate 93, hinged by means of a suitable hinge structure 94 to the corresponding deflector plate, and in each of said wings 93 is an arcuate slot 94'. A bolt 95 extends through each deflector plate and the corresponding slot 94' and on the rear end of each of these bolts is a wing nut 95' so that each of the plates may be moved in a vertical arc and held in a selected position by adjustment of the nut 95'. It will be seen, therefore, by reference to Fig. 3, that when the blowers are rotated in a counterclockwise direction (as seen in Fig. 3) the snow from the blowers will be deflected from the plates 87, 88 and 89 against the wing plates 93 which will control the angle at which the snow will be deflected with respect to the horizontal and therefore the distance to which it will be driven to the side of the machine by the blowers. Therefore, when the blowers are rotated, in the hereinbefore described manner, the snow will be deflected against the plates 89, 88 and 87 and to lift, as seen in Fig. 3, and in this manner being driven away from the path that is being plowed by the blowers.

By moving the lever 33 forward, so as to tilt or pivot the frame 23, the blowers may be elevated so that they may be started into a drift of snow from the top thereof, and worked in a substantially vertical plane down through the drift. Thus by moving the truck 10 ahead, short distances at a time, the blowers may be employed to eat away a section of a drift for each forward movement of the truck.

Having the upper ends of their arms attached, in any suitable manner to the frame 53, as at 93 (Fig. 4) are three substantially U-shaped shoes or runners 90, 91, and 92, one for each of the three blowers 42, 43, and 44, respectively, and when the blowers are working these runners rest upon the surface over which the blowers are moving so as to provide a base or rest for the blowers and the front end of the frame 23 together with the other parts associated therewith.

From the above description it will be apparent that the present invention provides a rotary snow plow which may be economically mounted upon any suitable vehicle and which will effectively plow a relatively wide, flat path through a snow covered highway, railroad track, sidewalk or other lane of traffic.

It is within the purview of this invention to drive the three blowers in offset and overlapping relation by means of power supplied to shaft 49 from the motor of the truck 10 or in any other manner such as by an electric motor, steam locomotive, electric locomotive, and the like.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In rotary snow plows, a plurality of rotatable blowers arranged in offset, parallel and overlapping relation with respect to each other, a deflector plate extending over and above each blower and the top portions of said plates being in the same horizontal plane, and a wing plate hingedly connected to each of said deflector plates and adjustable in a vertical arc so as to control the angle at which the snow will leave the deflector plates when driven thereagainst by said blowers.

2. In a rotary snow plow, a plurality of rotary blowers arranged in parallel, staggered and overlapping relation with respect to each other, a snow deflector plate extending horizontally over and above each of said blowers and the top portions of said plates being in the same horizontal plane, a wing plate hingedly connected to one end of each of said deflector plates, and means carried by said deflector plates for holding said wing plates in an adjusted position.

In testimony whereof I affix my signature.

THOMAS J. NEAL.